United States Patent [19]

Haas

[11] 4,367,508

[45] Jan. 4, 1983

[54] CURRENT LIMITER

[75] Inventor: Wilfried Haas, Grossenseebach, Fed. Rep. of Germany

[73] Assignee: Siemens Aktiengesellschaft, Berlin and Munich, Fed. Rep. of Germany

[21] Appl. No.: 184,391

[22] Filed: Sep. 5, 1980

[30] Foreign Application Priority Data

Sep. 17, 1979 [DE] Fed. Rep. of Germany ....... 2937490

[51] Int. Cl.3 ................................................ H02H 9/02

[52] U.S. Cl. ............................... 361/58; 200/144 AP; 200/148 C

[58] Field of Search ................... 361/58; 200/144 AP, 200/144 R, 149 A, 148 C; 267/162

[56] References Cited

U.S. PATENT DOCUMENTS 2,162,719 6/1939 Hay .................................... 267/162

FOREIGN PATENT DOCUMENTS 1085324 7/1954 France .......................... 200/144 AP 566640 7/1975 Switzerland ......................... 361/58

*Primary Examiner*—Reinhard J. Eisenzopf

*Attorney, Agent, or Firm*—Kenyon & Kenyon

[57] ABSTRACT

A current limiter which is electrically arranged in series with a circuit breaker, the current limiter having contacts which are movable with respect to one another in an axial direction. A spring having a nonlinear characteristic is provided for producing a force which tends to counteract the motion of the contacts away from one another. While the contacts are in a closed position, the spring exerts a small closing force, thereby permitting the contacts to open by the force of overcurrent. Such opening produces an arc which causes a wall of arcing chamber to emit gas, thereby pressurizing the arcing chamber and causing further opening of the contacts. As the contacts are opened, the nonlinear spring characteristic increasingly tends to prevent the motion of the contacts, thereby reducing mechanical stress within the limiter.

4 Claims, 1 Drawing Figure

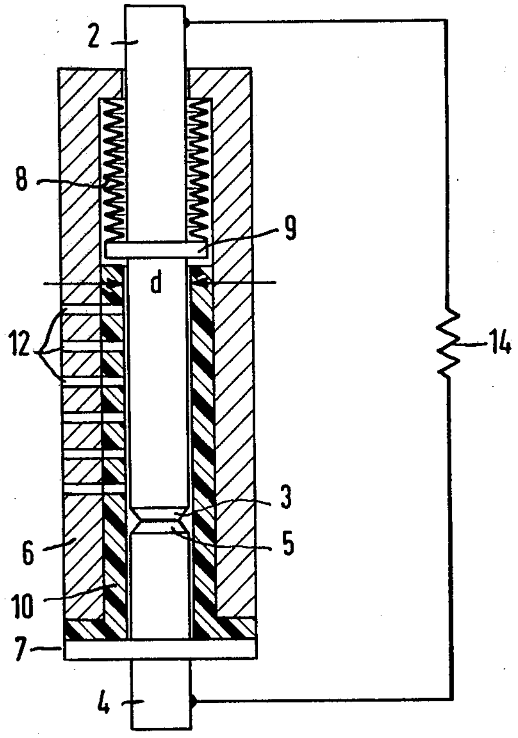
2
8
9
d
12
14
3
5
6
10
7
4

CURRENT LIMITER

BACKGROUND OF THE INVENTION

This invention relates generally to current limiters, and more particularly to a current limiter having coaxial contacts which are spring loaded against one another and which, when opened, form an arcing chamber, the walls of which may emit a gas.

One known current limiter device which utilizes a current-carrying spring to provide contact pressure for a pair of axially aligned contacts is shown in Swiss Pat. No. 566 640. The current-carrying spring additionally functions as an electrodynamic drive for opening the contacts. Thus, if the current through the spring exceeds a predetermined level, the spring contracts by operation of magnetic forces which are produced within the spring. Such contraction causes the axially aligned contacts to open. As the contacts are open, an arc is produced which causes the walls of a chamber in which the contacts are disposed to emit a gas. Such an emission of gas increases the pressure in the chamber. The combination of the increased pressure in the chamber and the increased distance between the contacts causes an increase in the voltage required to maintain the arc, thereby limiting the current through the spring. After the contacts have been separated by a predetermined distance, discharge openings are exposed which permit the pressurized gas to flow into a chamber having a volume larger than the arc chamber, and which is provided with discharge openings for the gas. This embodiment, however, has the disadvantage that the fabrication and design of the compression spring which must carry a predetermined current corresponding to the current rating of the device is complex and expensive.

It is, therefore, an object of this invention to improve current limiting devices.

It is a further object of this invention to provide an improved current limiting device which is inexpensive and is simple to manufacture.

It is another object of this invention to provide a current limiting device which does not unduly stress a mechanical structure as the contacts are opened.

SUMMARY OF THE INVENTION

The foregoing and other objects are achieved by this invention which provides pressure to axially aligned contacts by the use of a compression spring having a nonlinear characteristic.

In one embodiment of the invention, the nonlinear spring is combined with the axially aligned contacts so that a nonlinearly increasing force is required to maintain the contacts open as the distance between them increases. Such non-linearity can be produced by the use of a compression spring containing a plurality of ring shaped cup. Alternatively, conical coiled springs are also suitable. The spring characteristics are such that when the contacts are in a closed position, the contact pressure is quite small. Thus, as the current increases to several times the rated current, illustratively thirty times the nominal current as would be the case of a short circit condition, the contacts are opened by the force of the current. Such contact opening causes an arc to burn in a canal, the diameter of which is not much larger than the diameter of the movable contact. The inside wall of the cylindrical arc canal consists of an electrically insulating material which emits gas at elevated temperatures. Illustratively, such a material may be a plastic of the fluorinated type such as polytetrafluroethylene (Teflon). The emission of the gas into the cylindrical canal creates a relatively high pressure which causes a further and rapid opening of the contacts. The combination of the increased pressure in the canal and the cooling effect caused by the evaporation of wall material produces arc field strengths of several hundred volts per centimeter, illustratively, more than five hundred volts per centimeter. As the contacts open, the spring force increases correspondingly so as to apply a braking force against the opening force of the contacts. Such a braking force substantially reduces the mechanical shock stress which is applied to the housing of the device when the contacts are opened.

In another embodiment of the invention, the current limiter is protected from excessive pressure stresses by providing gas release openings which are disposed in the canal wall and which are exposed as the contacts are opened.

BRIEF DESCRIPTION OF THE DRAWINGS

Comprehension of the invention is facilitated by reading the following detailed description in conjunction with the annexed drawing which shows an illustrative embodiment of a current limiter which operates in accordance with the principles of the invention.

DETAILED DESCRIPTION

The FIGURE shows two current-carrying contacts 2 and 4 which are axially arranged with respect to one another and are provided with respective contact overlays 3 and 5. Contact 4 is provided with a flange portion 7 on which is disposed a hollow cylindrical housing 6 which surrounds a hollow cylindrical lining 10. Cylindrical housing 6 is formed of a pressure-proof material, illustratively steel, and is electrically insulated from at least one of the contacts 2 and 4. A compression spring 8, which in one embodiment may contain between twenty and thirty cup springs, has a spring constant which increases compressively and which provides only a small contact pressure when contacts 2 and 4 are in a closed position. In the specific illustrative embodiment, spring 8 is disposed surrounding contact 2 and within cylindrical housing 6. A flange portion 9 of contact 2 serves as a stop for the spring, and is the means by which the contact pressure exerted by the spring is mechanically conducted to contact 2. Cylindrical housing 6 is provided with an opening so that contact 2 may communicate externally thereof. Cylindrical lining 10 which is disposed within cylindrical housing 6 has an internal diameter d which is relatively constant throughout the axial length of the cylindrical lining, and which closely surrounds the external surfaces of contacts 2 and 4.

In a specific illustrative embodiment which is rated for a current of 0.2 kA, the contact pressure of compression spring 8 may be pre-selected at 15 N. If the current is increased to illustratively thirty times the nominal current, contacts 2 and 4 will open as a result of the force of the current. Since, as indicated, the compressive force of the spring is nonlinear, a compressive spring travel of illustratively 10 mm may produce a reactive spring force of 200 N. The inside diameter d of cylindrical lining 10 may be chosen to be a few tenths of a millimeter, illustratively 0.2 to 0.4 mm, larger than the diameter of the ends of contacts 2 and 4. As the contacts are opened, the resulting arc in the cylindrical arcing chamber raises the temperature of the inner wall of the cylindrical lining 10 causing it to emit a gas which pressurizes the arc chamber. In some embodiments, such pressures may be within the range of 100 to 500 bar. The forces applied to movable contact 2 as a result of such pressurization will cause it to move axially away from contact 4 for a distance of approximately 2 to 3 cm, thereby causing a continuation in the increase of the reactive spring force. In one embodiment, compression of the spring by 2 cm results in a reactive force of 800 N. The large reactive spring force acts as a breaking force against the acceleration of contact 2 thereby substantially reducing the mechanical shock stress at the end of housing 6.

In a further embodiment of the invention, the arc chamber can be provided with openings 12 which function as relief openings for gases released by cylindrical housing 10 as a result of the arc. Thus, such openings limit the pressure in the arc chamber.

In the specific illustrative embodiment, the current limiter can be advantageously shunted by a current limiting resistor 14, which may have a resistance of 30 mohms. As the voltage required to maintain the arc in the arc chamber increases as a result of the increasing distance between contacts 2 and 4, a point will be reached where the required arc-maintaining voltage exceeds the voltage drop across current limiting resistor 14, which is connected at respective ends to contacts 2 and 4. At that point, the current being conducted through the arc is conducted by resistor 14, and the arc is extinguished. The high short circuit current which is conducted through current limiting resistor 14, which may be approximately 14 kA, it discontinued by a main circuit breaker which is arranged in series with the current limiter (not shown). Approximately 15 milliseconds after the arc is extinguished, contacts 2 and 4 are closed again by operation of compression spring 8, and the current limiter is thereby again prepared for use.

In the specific illustrative embodiment, only contact 2 is made movable and is provided with a compression spring 8. In other embodiments, however, it may be desired to construct the contacts so that they are both movable and provided with respective springs. In such an embodiment, the permissible contact opening distance is considerably increased, thereby producing a corresponding increase in the arc voltage.

It is to be understood that although the inventive concept disclosed herein has been described in terms of specific embodiments and applications, other applications and embodiments will be obvious to persons skilled in the pertinent art without departing from the scope of the invention. The drawings and descriptions of specific embodiments of the invention in this disclosure are illustrative of applications of the invention and should not be construed to limit the scope thereof.

What is claimed is:

1. A current limiter having at least two contacts which are axially movable with respect to one another, the contacts being disposed within a housing formed of a material which emits gas, so as to provide an arcing chamber as the contacts are moved axially apart, the current limiter further comprising a spring having a nonlinear characterstic for producing a force in a direction opposite to the direction of axial opening motion of the contacts said spring urging the contacts toward one another with a relatively small force when the contacts are in a closed position, said force increasing nonlinearly as the contacts move axially apart from one another.

2. The current limiter of claim 1 wherein said spring is of a compression type and formed of ring shaped cupped springs.

3. The current limiter of claim 1 wherein the contacts are each of a cylindrical configuration, and the housing has an inner wall which defines a cylindrical volume having a longitudinal central axis, said volume having an internal radius with respect to said longitudinal central axis which is substantially constant over the length of contact travel therein.

4. The current limiter of claim 1 where there is further provided a shunt resistor connected in parallel across the contacts.

* * * * *